(12) United States Patent
Shigeta (10) Patent No.: US 7,400,834 B2
(45) Date of Patent: Jul. 15, 2008

(54) OPTICAL SPACE TRANSMISSION APPARATUS AND OPTICAL SPACE COMMUNICATION SYSTEM

(75) Inventor: Junji Shigeta, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 615 days.

(21) Appl. No.: 11/002,016

(22) Filed: Dec. 2, 2004

(65) Prior Publication Data

US 2005/0129406 A1    Jun. 16, 2005

(30) Foreign Application Priority Data

Dec. 11, 2003    (JP)    ............................. 2003-413892

(51) Int. Cl.
*H04B 10/00*    (2006.01)

(52) U.S. Cl. ..................... 398/119; 398/118; 398/129; 398/131

(58) Field of Classification Search ................. 398/118, 398/119, 122, 123, 129, 131, 121, 124, 125, 398/127, 128, 130, 135, 136, 137, 138
See application file for complete search history.

(56) References Cited

U.S. PATENT DOCUMENTS

| 5,500,639 | A * | 3/1996 | Walley et al. ............ 340/539.19 |
| 7,058,307 | B2 * | 6/2006 | Sakanaka ..................... 398/119 |
| 2003/0175031 | A1 * | 9/2003 | Shikakura et al. ........... 398/118 |

FOREIGN PATENT DOCUMENTS

| EP | 1 054 520 B1 | 8/2002 |
| JP | 2000-224112 A | 8/2000 |

* cited by examiner

*Primary Examiner*—M. R. Sedighian
(74) *Attorney, Agent, or Firm*—Morgan & Finnegan, L.L.P.

(57) ABSTRACT

An optical space transmission apparatus which performs a first communication, in which a light beam propagating through a space is used, with a remote apparatus includes a communication section and an identification section. Here, the communication section performs a second communication, which is different from the first communication, with a plurality of remote apparatuses and the identification section identifies the remote apparatus, which performs the first communication, from among the plurality of remote apparatuses by performing the second communication.

4 Claims, 6 Drawing Sheets

OPTICAL SPACE TRANSMISSION APPARATUS AND OPTICAL SPACE COMMUNICATION SYSTEM

BACKGROUND OF THE INVENTION

1. Field of the Invention

The present invention relates to an optical space transmission apparatus which communicates from a communication apparatus installed at one point with communication apparatuses installed at a plurality of points using an optical signal which propagates through the air.

2. Description of the Related Art

Figure 6:
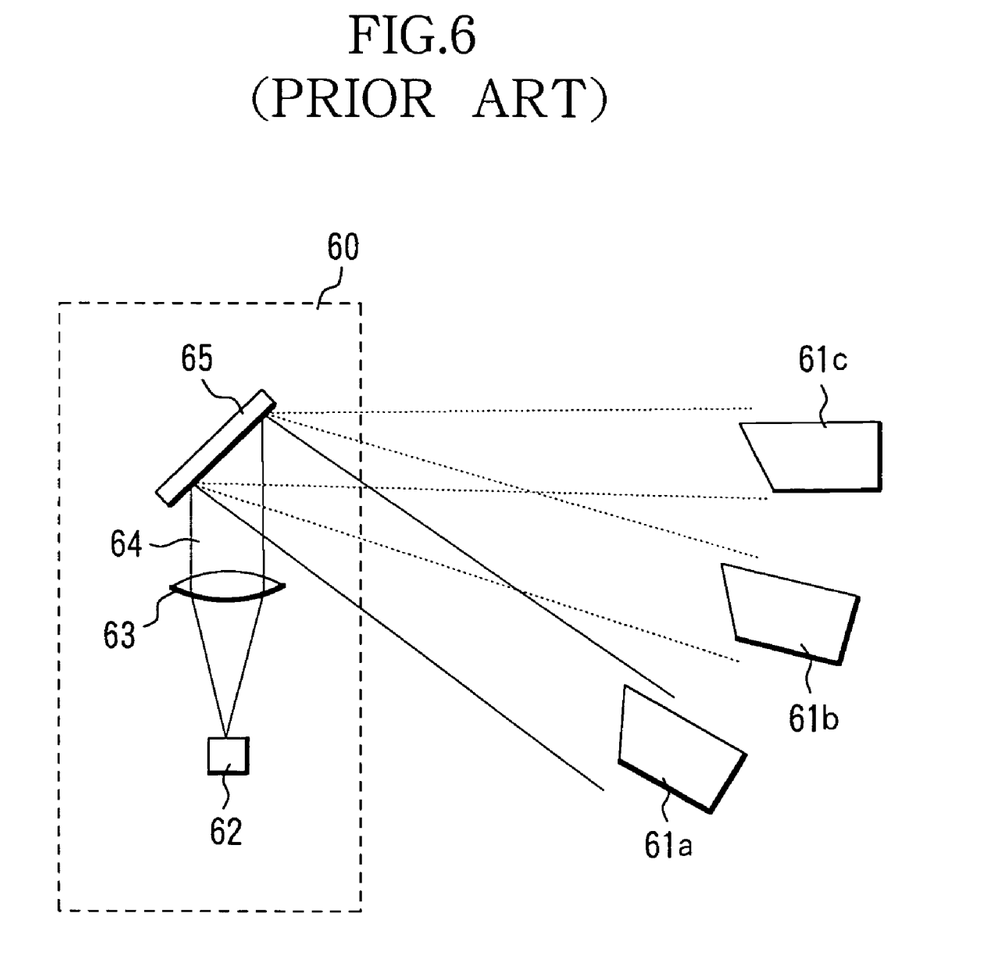
FIG. 6 is a schematic block diagram of an optical space communication system according to a conventional example.

Using FIG. 6, an overview of a conventional optical space communication system will be explained. Here, FIG. 6 is a schematic view of the conventional optical space communication system (Japanese Patent Laid-Open No. 2000-224112 (European Patent No. 1054520B1: European equivalent to the Japanese Patent)) and as shown in this schematic view, the optical space communication system is constructed by an optical space transmission apparatus 60 and remote apparatuses 61a to 61c.

An optical signal radiated from a light source 62 of the optical space transmission apparatus 60 is changed to a substantially parallel light beam 64 which is spread a little when passing through an optical system 63, this light beam 64 is reflected on a movable mirror 65 and transmitted to the respective remote apparatuses 61a to 61c.

Furthermore, the movable mirror 65 is driven according to a preset sequence and angle, and when a transmission to the remote apparatus 61a is completed, then the movable mirror 65 directs the light beam to the remote apparatus 61b, and when a transmission to the remote apparatus 61b is completed, then the movable mirror 65 directs the light beam to the remote apparatus 61c and transmits the light beam to the remote apparatus 61c. In this way, by scanning the remote apparatuses sequentially and performing communications, communications are established between a communication apparatus installed at one point and communication apparatuses installed at a plurality of points.

This scanning is performed at a high speed and the users of the respective remote apparatuses need not be aware of a waiting time when receiving signals. Moreover, an optical signal is free of restrictions on the frequency band as in the case of radio waves, and can thereby transmit information at a high speed and communicate a sufficient volume of information even through intermittent transmissions using sequential scanning.

Moreover, in the above described Japanese Patent, it is proposed that a center apparatus scans respective remote apparatuses using a mirror, is provided with a light source and an optical detector to perform bidirectional communications with the remote apparatuses.

Furthermore, for reasons of safety of eyes, to prevent degradation of the communication quality of optical radio waves generated due to attenuation of light beams caused by weather conditions such as rain and snow under conditions in which the output levels of light beams are limited, it is necessary to narrow the diameters of light beams and correctly direct the light beams to the remote apparatuses. As a method of realizing this, in the Japanese Patent Laid-Open No. 2000-224112, it is proposed about a function in which five photodiodes are arrayed and the directions of light beams based on the outputs of the respective photodiodes are corrected.

Moreover, a method of calculating the directions of the remote apparatuses by projecting the light beams sent from the remote apparatuses onto an optical position detection element is also widely known as a method of correcting the directions of light beams.

However, for the method of changing the angle of the mirror according to a preset sequence and angle and sequentially scanning all the remote apparatuses, communication channels are also established with remote apparatuses not requiring communications. For this reason, when many remote apparatuses are scanned, the mirror is also driven to irradiate light beams to remote apparatuses not requiring communications, wasting the time to decide that communications are not necessary, unable to allocate sufficient communication times to remote apparatuses requiring communications. Furthermore, the method of using an array of five photodiodes to correctly direct light beams to remote apparatuses and finding exact directions of the remote apparatuses based on the outputs of the respective photodiodes and the optical position detection elements, etc., is adopted, but when the power of a remote apparatus is OFF, the center apparatus cannot identify the remote apparatus and wastes time until the center apparatus searches the remote apparatus and decides consequently that a communication therewith is not possible, unable to realize efficient optical space communications between one point and multi points.

Moreover, even when the power of the remote apparatus is ON, a processing time for correctly directing light beams to remote apparatuses not requiring communications is wasted, unable to realize efficient optical space communications between one point and multi points.

SUMMARY OF THE INVENTION

One aspect of the optical space transmission apparatus of the present invention performs a first communication, in which a light beam propagating through a space is used, with a remote apparatus and includes a communication section and an identification section. Here, the communication section performs a second communication, which is different from the first communication, with a plurality of remote apparatuses and the identification section identifies the remote apparatus, which performs the first communication, from among the plurality of remote apparatuses by performing the second communication.

One aspect of the optical space communication system of the present invention includes the optical space transmission apparatus and the plurality of remote apparatuses.

The features of the optical space transmission apparatus and the optical space communication system of the present invention will become more apparent from the following detailed description of a preferred embodiment of the invention with reference to the drawings.

DETAILED DESCRIPTION OF THE PREFERRED EMBODIMENTS

Embodiments of the present invention will be explained below.

Embodiment 1

Figure 1:
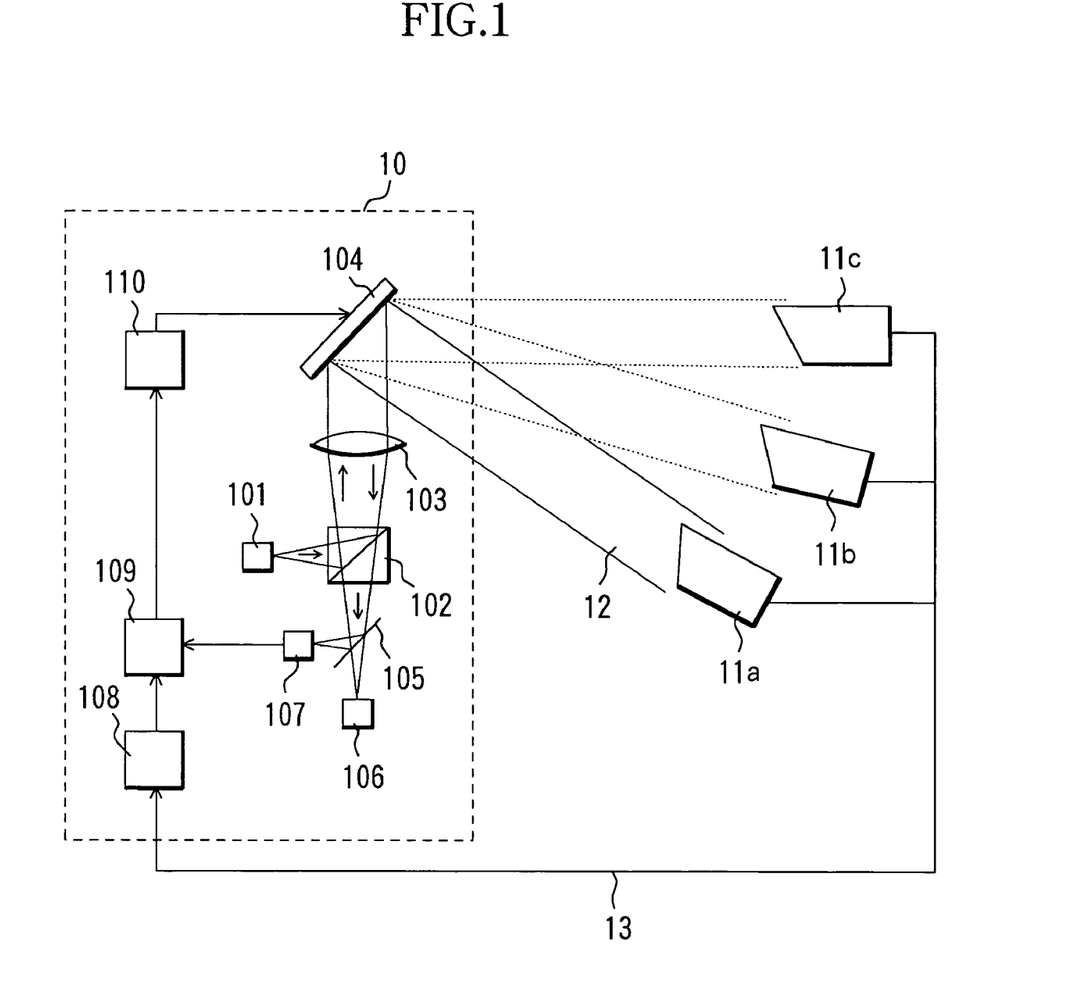
FIG. 1 is a schematic block diagram of an optical space communication system according to Embodiments 1 to 3.

FIG. 1 is a schematic diagram of an optical space communication system according to an embodiment of the present invention. In FIG. 1, reference numeral 10 denotes a center apparatus (an optical space transmission apparatus) and 11a, 11b, 11c denote remote apparatuses. Here, when the respective remote apparatuses 11a to 11c need to communicate with the center apparatus 10, the remote apparatuses requests the center apparatus 10 for communications using a low-speed channel 13 (e.g., telephone line, radio channel, another optical channel).

The center apparatus 10 scans the remote apparatuses which have requested communications through the low-speed channel 13 using a light beam 12 and sequentially performs bidirectional communications with the remote apparatuses. Here, if a telephone line is used as the low-speed channel 13, it is possible to use an existing communication line and thereby reduce costs.

When a communication with one remote apparatus is completed, a movable mirror 104 is driven to switch a scan to the next remote apparatus which has requested a communication through the low-speed channel 13.

The center apparatus 10 is provided with a light-emitting element 101 (e.g., semiconductor laser) and a transmission light emitted from this light-emitting element 101 is sent to the remote apparatuses 11a to 11c. The transmission light emitted from the light-emitting element 101 is deflected and the deflection direction is set to the direction horizontal to the surface of the sheet.

Furthermore, the transmission light is reflected by the polarization beam splitter 102 toward a transmission/reception lens 103, passes through the transmission/reception lens 103 and is changed to a substantially parallel light beam which is spread a little. This light beam enters a movable mirror 104 (reflective member) and is sent to a desired remote apparatus by changing the angle of the movable mirror 104.

On the other hand, the received light sent from the remote apparatuses 11a to 11c follows a reverse path on the same optical axis as that of the transmission optical signal of the center apparatus 10, is reflected on the movable mirror 104, then passes through the transmission/reception lens 103 and enters the polarization beam splitter 102. Here, since the polarization direction of the received light from the remote apparatuses 11a to 11c is set to the direction perpendicular to the polarization direction of the transmission light (the polarization direction is a direction perpendicular to the surface of the sheet), the received light passes through the polarization beam splitter 102 as is and enters a beam splitter 105.

Most of the received light passes through the beam splitter 105, enters a light-receiving element 106 for detection of an optical signal and is detected as a communication signal, while a part of the light is reflected by the beam splitter 105 and enters an optical position detection element 107.

Next, the structure of the optical position detection element 107 will be explained using FIG. 2. Here, FIG. 2 is a front view of the light-receiving surface of the optical position detection element 107 and shows a spot formed on this light-receiving surface together.

The optical position detection element 107 is a photodiode divided into four portions 21a to 21d and is designed to output signals according to a light intensity distribution of a light spot 22 formed on the light-receiving surface from these photodiodes 21a to 21d.

Figure 2:
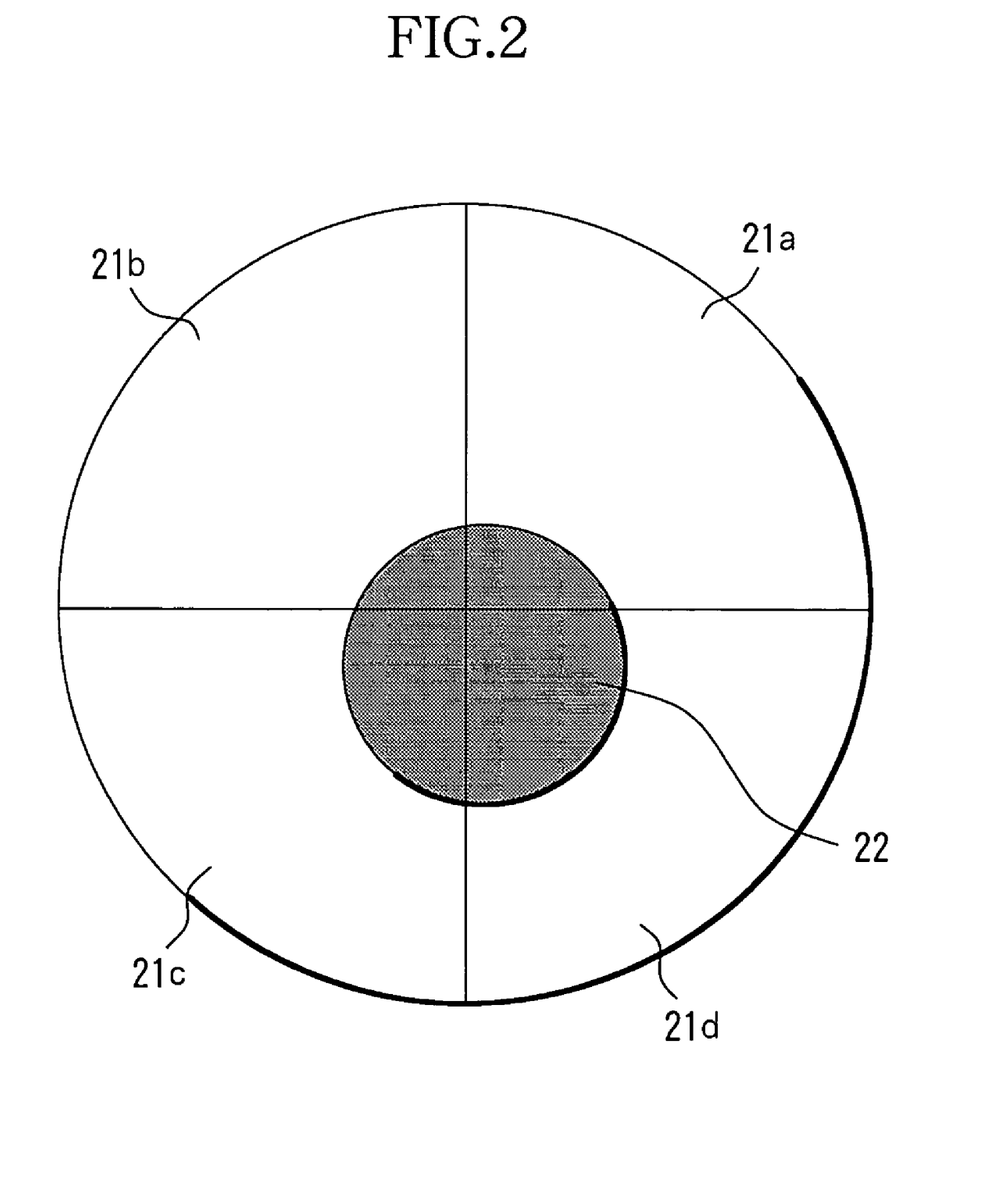
FIG. 2 is a front view of the light-receiving surface of an optical position detection element.

As shown in FIG. 2, the light spot 22 is formed on a peripheral area slightly away from the central area of the photodiodes 21a to 21d in the condition before a correction of the optical axis shift which will be described later.

The light incident upon the photodiode 107 is photoelectrically converted, and then transmitted to a control circuit 109 where the output voltages from the photodiodes 21a to 21d are compared and an optical axis shift correction information is thereby generated.

Then, the control circuit 109 generates a drive signal for driving the movable mirror 104 based on this optical axis shift correction information and sends this information to a drive circuit 110. This causes the movable mirror 104 to be driven to shift the light spot 22 positioned in the peripheral area of the photodiodes 21a to 21d to the central area so that the output voltages output from the photodiodes 21a to 21d become substantially equal. As a result, the shift on the optical axis between the transmission light and the received light is corrected and an automatic tracking is performed so that the transmission light sequentially scans the remote apparatuses.

A communication request from a first remote apparatus (e.g., the remote apparatus 11a) sent through the low-speed channel 13 is received by a communication unit 108 and the information thereof is sent to the control circuit 109 (an identification section). When the communication with the first remote apparatus is completed, the control circuit 109 drives the movable mirror 104 so that the light beam 12 is directed to a second remote apparatus (e.g., the remote apparatus 11b) which has sent the next communication request through the communication unit 108.

In the above embodiment, the movable mirror 104 is driven so as to communicate transmission light in order in which communication requests are sent, but it is also possible to switch the movable mirror 104 in order in which the remote apparatuses 11a to 11d are registered, in descending order of priority given to the communication requests, in ascending order of distances to the center apparatus 10 or in order combining these orders.

Figure 3:
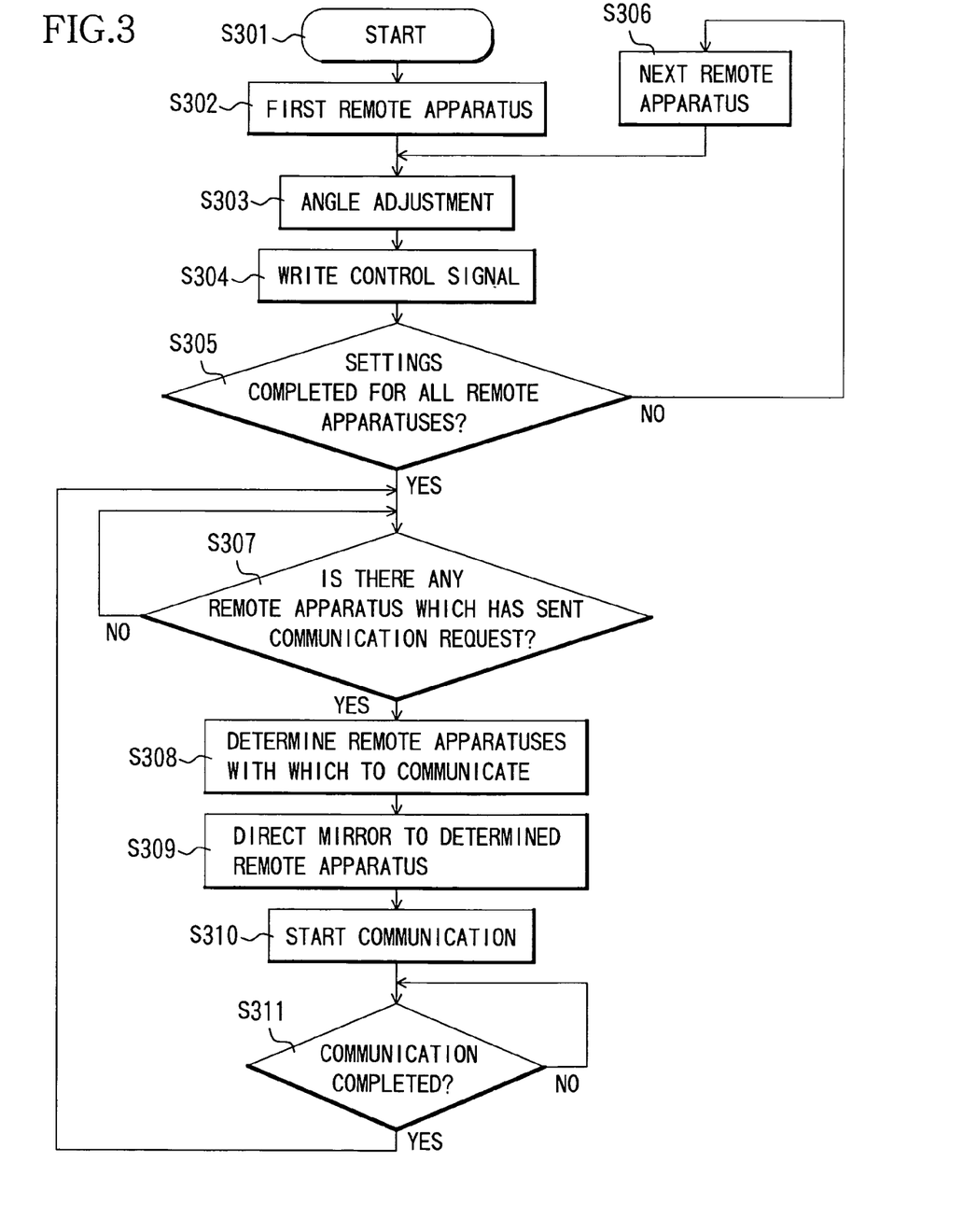
FIG. 3 is a flow chart showing a control procedure executed in a center apparatus according to Embodiment 1.

FIG. 3 shows a control flow at the center apparatus 10 according to this embodiment of the present invention. In the process in S302, the first remote apparatus is determined and in the process in S303, an initial direction adjustment is made to the remote apparatus determined in S302. The initial direction adjustment at the time of installation, etc., is made by manually driving the movable mirror 104 for the respective remote apparatuses. Furthermore, it is also possible to adopt a method of automatically calculating the direction of the remote apparatus by calculating a position coordinate information on the center apparatus and the remote apparatus using GPS, etc.

When the angle of the movable mirror 104 is moved and the optical signal from the user can be received to a certain degree, an automatic tracking functions, and therefore it is possible to accurately direct the light beam to the remote apparatus.

In the process in S304, the angle information on the movable mirror 104 at that time is written in a memory in the control circuit 109. When the initial direction settings for all the remote apparatuses 11a to 11d are not completed in the process in S305, the next remote apparatus is determined in the process in S306, and S303 and S304 are repeated until the initial direction settings for all the remote apparatuses 11a to 11d are completed.

When the initial direction settings for all the remote apparatuses 11a to 11d are completed, it is decided in the process in S307 whether there is any remote apparatus which has sent a communication request and S307 is repeated until a remote apparatus which has sent a communication request appears. When a remote apparatus which has sent a communication request is found in the process in S307, the remote apparatus is determined in the process in S308 in any one of order in which the remote apparatuses 11a to 11d are registered, order of communication requests, descending order of priority given to the communication requests, ascending order of distances to the center apparatus 10 or order combining these orders.

Then, in the process in S309, the movable mirror 104 is driven in the direction of the remote apparatus determined in the process in S308 and when an optical communication with the remote apparatus is established, the communication is started in the process in S310. Here, the remote apparatus directs a light beam to the center apparatus. A loop is executed until the communication is completed in the process in S311 and when the communication is completed, the process goes back to S307 and repeats steps in S307 to S311.

Embodiment 2

Figure 4:
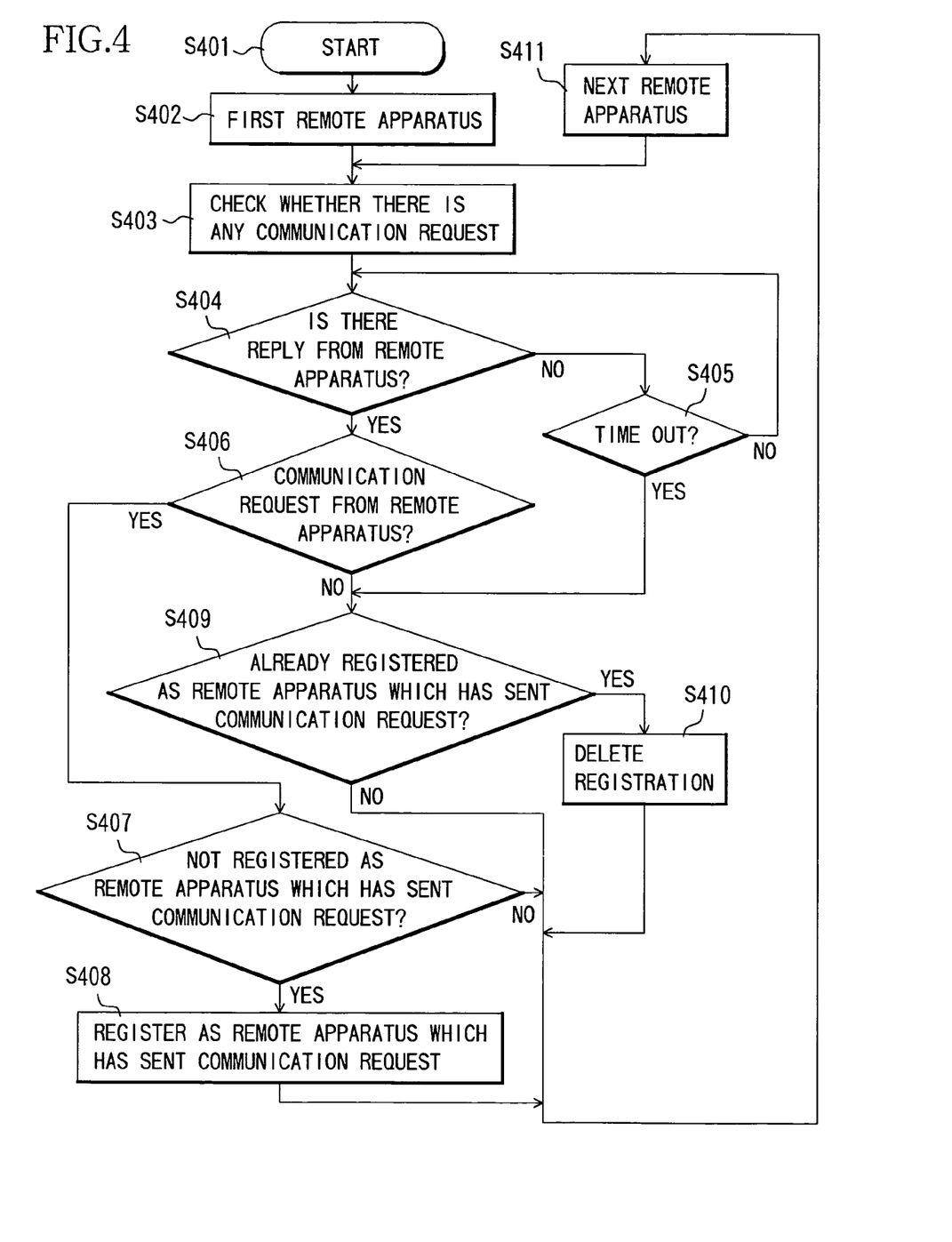
FIG. 4 is a flow chart showing a control procedure executed in a center apparatus according to Embodiment 2.

FIG. 4 shows a processing flow of searching a remote apparatus which has sent a communication request in the center apparatus 10 of this embodiment using a low-speed channel 13.

First, in S402, a remote apparatus for which it is checked to see whether there is any communication request or not is determined and the remote apparatus is registered. Then, in S403, it is checked to see whether there is any communication request or not from the remote apparatus determined in the process in S402 and a reply from this remote apparatus is waited. When no reply is received from the remote apparatus in S404, the processes in S404 and S405 are repeated until the waiting times out in S405. When there is a reply from the remote apparatus in S404, the process moves to the process in S406 and when the reply from the remote apparatus is a communication request, the process moves to S407.

In S407, it is decided whether the remote apparatus which has sent a communication request is registered as the remote apparatus which has sent a communication request or not, and if the remote apparatus is not registered yet, the remote apparatus is registered as the remote apparatus which has sent a communication request in the process in S408 and the process goes back to S411. When the remote apparatus is already registered, the process go back to S411 as is.

When the reply from the remote apparatus is not a communication request in the process in S406, the process moves to S409 and checks to see whether the remote apparatus is already registered as the remote apparatus which has sent a communication request or not. When the remote apparatus is registered as the remote apparatus which has sent a communication request, the registration is deleted in the process in S410 and when the remote apparatus is not registered, the process moves to the process in S411 as is. The next remote apparatus to be checked is determined in the process in S411 and the process goes back to S403 and repeats the above described flow.

Embodiment 3

Figure 5:
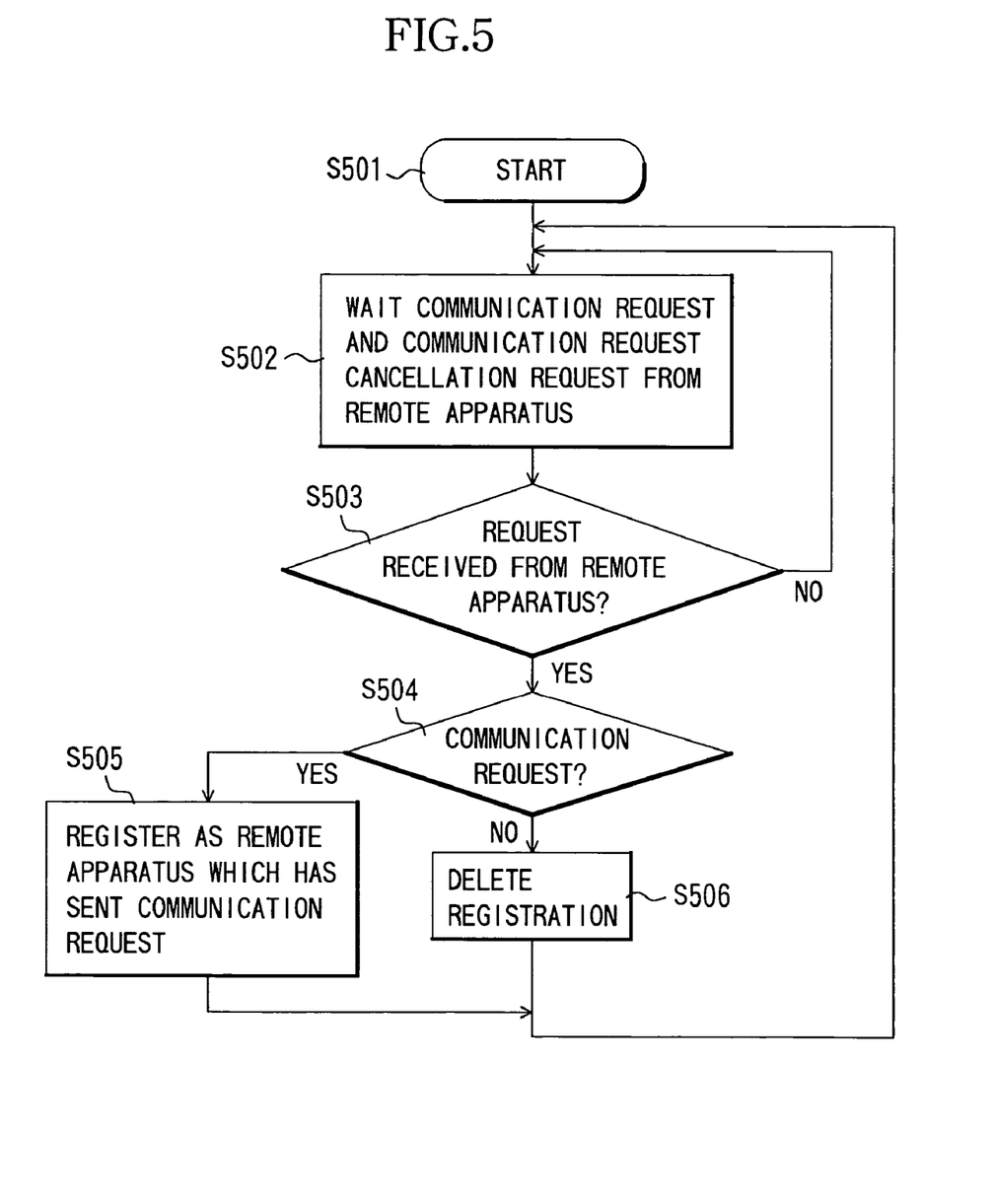
FIG. 5 is a flow chart showing a control procedure executed in a center apparatus according to Embodiment 3.

FIG. 5 shows a processing flow of spontaneously sending a communication request from the remote apparatuses 11a to 11d. In the process in S502, the center apparatus 10 waits a communication request and the communication request cancellation request from the remote apparatuses. Upon receiving the request from the remote apparatus in the process in S503, the process moves to the process in S504 and if the request is a communication request, the remote apparatus is registered as the remote apparatus which has sent a communication request in the process in S505. When the request is the communication request cancellation request in the process in S504, this remote apparatus is deleted from the registration of remote apparatuses which have sent communication requests in the process in S506. Then, the process moves to the process in S502 and repeats the above described flow thereafter.

Embodiments 1 to 3 above have assumed that the number of remote apparatuses is four but it goes without saying that the number of remote apparatuses can be three or less or five or more.

According to the embodiments above, it is possible to communicate with only the remote apparatuses requiring communications and thereby efficiently communicate with a plurality of remote apparatuses. Furthermore, it is possible to remove remote apparatuses not requiring communications from those to be scanned and thereby secure more communication times for remote apparatuses requiring communications.

While preferred embodiments have been described, it is to be understood that modification and variation of the present invention may be made without departing from the scope of the following claims.

"This application claims priority from Japanese Patent Application No. 2003-413892 filed on Dec. 11, 2003, which is hereby incorporated by reference herein."

What is claimed is:

1. An optical space transmission apparatus which performs a first communication with a remote apparatus via a light beam propagating through a space comprising:

a communication section which performs a second communication with a plurality of remote apparatuses, the second communication being conveyed via a different communication medium than the first communication;

an identification section which identifies a remote apparatus, from among the plurality of remote apparatuses configured to communicate using the first communication by performing the second communication;

a control section which controls the optical space transmission apparatus so as to perform the first communication with only the remote apparatus identified by the identification section from among the plurality of remote apparatuses; and     an optical system which performs the first communication, wherein the control section performs a control which sets a communication direction of the optical system to a direction of the identified remote apparatus;

wherein the optical system comprises a reflection member which is directed to a direction which differs corresponding to each of the plurality of remote apparatuses, and the control section sets the reflection member to a direction corresponding to the identified remote apparatus;

wherein, when a remote apparatus that has sent a communication request via the second communication is not registered with the transmission apparatus as a remote apparatus that is to communicate using the first communication, the remote apparatus that has sent the communication request is registered with the transmission apparatus; and when a remote apparatus that has not sent a communication request via the second communication is registered with the transmission apparatus as a remote apparatus that is to communicate using the first communication, the registration of the remote apparatus with the transmission apparatus is deleted.

2. The optical space transmission apparatus according to claim 1, wherein when there are a plurality of identified remote apparatuses, the control section controls the optical space transmission apparatus so as to sequentially perform the first communication with the plurality of identified remote apparatuses.

3. An optical space communication system comprising:

the optical space transmission apparatus according to claim 2; and the plurality of remote apparatuses which perform the first communication and the second communication with the optical space transmission apparatus.

4. An optical space communication system comprising:

the optical space transmission apparatus according to claim 1; and the plurality of remote apparatuses which perform the first communication and the second communication with the optical space transmission apparatus.

* * * * *